United States Patent Office 3,003,965
Patented Oct. 10, 1961

3,003,965
METHOD OF PREPARING A MAGNETIC SOUND CARRIER
Sjerp Anne Troelstra and Jan Anton Willem van Laar, Eindhoven, Netherlands, assignors, by mesne assignments, to North American Philips Company, Inc., New York, N.Y., a corporation of Delaware
No Drawing. Filed Aug. 25, 1954, Ser. No. 452,212
Claims priority, application Netherlands Sept. 29, 1953
6 Claims. (Cl. 252—62.5)

This invention relates to methods of distributing powders in organic liquids, to methods of manufacturing powders which exhibit this tendency to a smaller extent, and to magnetic sound carriers manufactured by the use of the invention.

As is well known (Verwey and Overbeek, Elsevier Publishing Inc. 1948, pages 13 to 18), a homogeneous distribution of powder particles in an organic liquid is rendered difficult due to the powder particles aggregating to a smaller or greater extent, the formation of aggregates of particles suspended in a liquid resulting in a high speed of settling and in a voluminous sediment which frequency exhibits a consistency corresponding to a plastic mass.

However, if aggregates are not formed, the suspended particles settle at a slow rate and the little voluminous sediment which is formed exhibits the "dilatency" phenomenon, which is to be understood in the specification that the sediment behaves as a somewhat viscous liquid in the case of a slow variation in shape and assumes the flowing properties of a tough mass in the case of a rapid variation in shape.

The invention comprises a method by which the tendency to form aggregates is suppressed, so that the properties of suspensions in organic liquids and of the sediments resulting therefrom may be changed in the above-mentioned respects.

According to the invention, for this purpose the powder to be distributed is treated with a derivative of phosphoric acid in which a phosphorus atom carries at least one acid function and at least one alkyl-, aryl or arakyl group, as the case may be on an interposed oxygen atom.

Suitable derivatives of phosphoric acid for use in the method according to the invention are the mono- and diortho-phosphoracid esters such as the esters of orthophosphoric acid and butanol-1, butanol-2, isobutanol-1, n-pentanol-1, n-hexanol-1, 2-ethylhexanol-1, decanol-1, phenol, cresol (o, m and p), xylenol and cardanol.

Other suitable derivatives of phosphoric acid are the phosphonic acids carrying the one group or two groups of hydrocarbon, for example mono- and dihexanephosphonic acid, mono- and di-styrenephosphonic acid and dibenzylphosphonic acid.

When the liquid phase substantially comprises substances having a substantially aromatic character, use is preferably made of those derivatives of phosphoric acid of which the organic residue has a substantially aromatic character. Thus, the mono- and di-, phenol-, cresol- and xylenol esters of orthophosphoric acid are very suitable for distributing powders in benzene, toluene and xylene or similar liquids, since small quantities of such derivatives of phosphoric acid prevent the aggregation of particles to a greater extent than corresponding quantities of such derivatives of phosphoric acid of which the organic residue has a substantially aliphatic character. However, the latter compounds are preferable if the liquid phase is constituted substantially or wholly by compounds having a substantially aliphatic character such as petrol, paraffin oil, methylethyl ketone or similar liquids. The phosphoric acid derivatives of which the organic residue only comprises methyl and ethyl groups usually have a smaller effect, so that use is preferably made of phosphoric acid derivatives in which an organic residue bound on a phosphor atom comprises at least 4 carbon atoms.

In addition to the kind of the phosphoric acid derivative used in the method according to the invention, the quantity of derivative is also important. Quantities of from 2 to 10 mgs. of phosphoric acid derivative per gram of powder to be distributed already produce a noticeable effect. When this amount is increased, there is usually a further decreasing tendency to form aggregates. An addition of from 5 to 25 mgs. per gram of powder to be distributed commonly produces the optimum effect.

The best results are obtained if powders are to be distributed which have acid-binding properties such as many powdery metals, powders of basic oxides, sulphides and of salts of a strong base and a weak acid.

Such powders probably re-act at the surface of the powder particles with the phosphoric acid derivatives to be used so as to be covered with a firmly bound layer of the phosphoric acid derivative used.

It has been found that, when use is made of acid-binding powders, the phosphoric acid derivatives having more than one acid function commonly yield a better effect, so that these powders are preferably used.

The method according to the invention may advantageously be applied to the manufacture of paint suspensions, which results in considerable shortening of the grinding treatment by which pigments of paint are distributed in an organic liquid and in a smaller tendency of the paint to settle.

The method according to the invention is preferably carried out in such manner that the phosphoric acid derivative is dissolved in the liquid phase. However, it is alternatively possible for the powders to be treated with a phosphoric acid derivative according to the invention, followed by distribution of the powders in an organic liquid. The invention may be applied with material advantage to a method in which magnetic powders are distributed in an organic liquid, since without the use of the invention such powders form aggregates to a considerable extent.

Consequently, the invention is important more particularly for the manufacture of magnetic sound carriers in which the sound may be recorded in a layer of magnetic powder. As is well-known, such sound carriers are manufactured in certain cases by distributing a magnetic powder in an organic liquid and subsequently forming a layer of this liquid, followed by hardening of the layer.

However, when in this method the magnetic powder is distributed in the organic liquid with the use of the invention, a sound carrier ensues having a low noise level.

*Example I*

100 gms. of powdery iron-oxide ($Fe_2O_3$) are ground in 1 litre of benzene in a ball mill. After grinding for 10 hours, the suspension is found to settle completely to form a voluminous flocky mass within some minutes. When 1 gm. of monostyrenephosphonic acid is added and the grinding treatment is continued for two hours, the resultant suspension has settled completely to form a compact sediment after a few hours only.

*Example II*

A suspension of 100 gms. of fine $Fe_2O_3$ powder in 1 litre of methyl-ethyl ketone has settled completely after some hours. When 1 gm. of a mixture consisting of mono- and dibutyl-orthophosphoric acid is dissolved in the liquid and the powder is again suspended, the suspension has not settled completely after a month. However, the compact sediment may be evenly distributed in the liquid by shaking.

Example III 50 mgs. of comparatively coarse titanium-dioxide powder are suspended in 500 ccs. of benzene, in which 1 gm. of monocardanyl phosphoric acid is dissolved. Not even half of the suspension has settled after 12 hours.

Example IV 100 gms. of $Cr_2O_3$ powder are suspended in 1 litre of methyl-ethyl ketone in which 1 gm. of monocardanyl phosphoric acid is dissolved. A distinct sediment has formed after a week only. However, the powder had not yet settled completely after two weeks.

Example V 100 gms. of $Cr_2O_3$ powder are ground with 10 gms. of polyvinylchloride and 50 ccs. of amylacetate-acetone (1:1). The resultant lacquer is thixotropic and leads to an irregular coating on the inner wall of the bottle in which the lacquer is shaked. However, the addition of 1 gm. of dicresyl phosphoric acid completely suppresses the thixotropy and the pigment is found to be homogeneously distributed in the liquid after shaking.

Example VI 80 gms. of magnetic $Fe_2O_3$ powder, suspended in 20 gms. of vinylchloride vinylacetate copolymer, are dissolved in a mixture consisting of 40 ccs. of acetone and 80 ccs. of benzene. This results in a thick clay-like mass. When this mass is mixed with 1 gm. of dicresyl-orthophosphoric acid, the mass becomes fluid and may readily be applied as an evenly thick layer to a carrier.

After evaporation of the solvents, a carrier for magnetic sound recording ensues having a low noise level.

What is claimed is:

1. The method of preparing a magnetic sound carrier comprising the steps, coating an insoluble magnetic powder with a dispersing agent consisting of a derivative of phosphorus selected from the group consisting of $$(R{-})_a\overset{O}{\underset{\|}{P}}({-}OH)_b \text{ and } (RO{-})_a\overset{O}{\underset{\|}{P}}(OH)_q$$

wherein $a$ is a whole number from 1 to 2, $b$ is a whole number from 1 to 2, $a+b=3$ and wherein R is selected from the group consisting of alkyl, aryl and aralkyl radicals, mixing said coated powder into a hardenable organic liquid to form a dispersion of said inorganic powder in said hardenable organic liquid and hardening said liquid.

2. The method of claim 1 in which R is an alkyl radical and the organic liquid is an aliphatic organic liquid.

3. The method of claim 1 in which R is an aromatic radical and the organic liquid in an aromatic organic liquid.

4. The method of claim 1 wherein there is used from 5 to 25 mgs. of the phosphorus derivative per gram of the insoluble powder.

5. The method of claim 1 wherein the phosphorus derivative contains only one organic group.

6. The method of claim 2 in which R contains at least 4 carbon atoms.

References Cited in the file of this patent

UNITED STATES PATENTS

| | | |
|---|---|---|
| 2,106,882 | Betz | Feb. 1, 1938 |
| 2,251,871 | Gamble et al. | Aug. 5, 1941 |
| 2,654,681 | Lueck | Oct. 6, 1953 |
| 2,676,925 | Lindstrom | Apr. 27, 1954 |

FOREIGN PATENTS

| | | |
|---|---|---|
| 513,667 | Belgium | Sept. 15, 1952 |
| 683,969 | Great Britain | Dec. 10, 1952 |

OTHER REFERENCES

Addendum to Tech. Rept. 1213 on Magnetic Fluid Clutch, May 9, 1949.

UNITED STATES PATENT OFFICE
CERTIFICATE OF CORRECTION

Patent No. 3,003,965            October 10, 1961

Sjerp Anne Troelstra et al.

It is hereby certified that error appears in the above numbered patent requiring correction and that the said Letters Patent should read as corrected below.

Column 4, lines 3 and 4, the right-hand formula should appear as shown below instead of as in the patent:

$$(RO-)_a \overset{\overset{O}{\|}}{P}(OH)_b$$

Signed and sealed this 17th day of April 1962.

(SEAL)
Attest:

ESTON G. JOHNSON            DAVID L. LADD

Attesting Officer            Commissioner of Patents